Nov. 27, 1956     S. E. KOZDEMBA     2,772,197
PLYWOOD PROCESS
Filed July 2, 1954
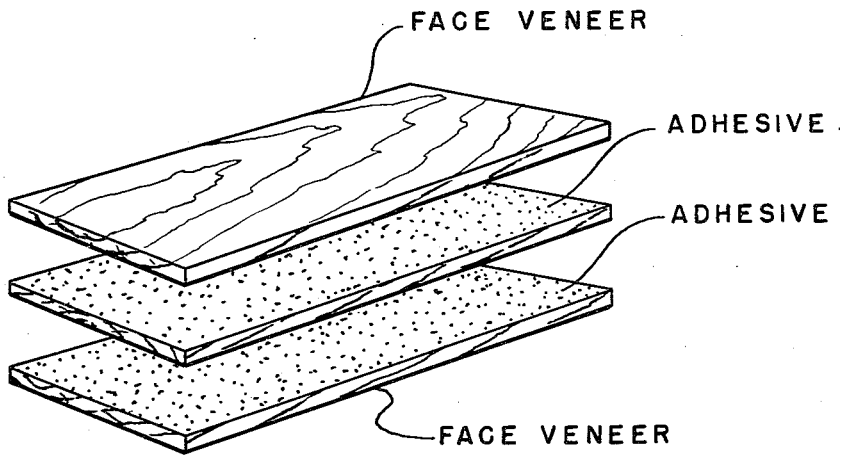
ADHESIVE CONTAINING A MIXTURE OF
UREA-FORMALDEHYDE RESIN AND
MELAMINE FORMALDEHYDE RESIN.
STANLEY E. KOZDEMBA
*INVENTOR.*
BY Robert M. Dickey
ATTORNEY.

United States Patent Office 2,772,197
Patented Nov. 27, 1956

2,772,197

PLYWOOD PROCESS

Stanley E. Kozdemba, Palmer, Mass., assignor to Monsanto Chemical Company, St. Louis, Mo., a corporation of Delaware Application July 2, 1954, Serial No. 441,169

3 Claims. (Cl. 154—133)

This invention relates to a process for preparing plywood. More particularly the invention relates to a process for preparing plywood having improved durability as measured by the resistance to boiling water.

There are two basic processes for preparing plywood known respectively as the hot press method and the cold press method. The hot press method involves the use of a thermosetting adhesive containing a formaldehyde condensate of urea, melamine or a phenol or mixtures thereof. The normal procedure is to coat the plies with adhesive, assemble the plies in stacks and then heat the stacked plies under heat and pressure.

Heretofore, it has been found necessary to complete the stacking process in from 15 minutes to 4 hours followed immediately by the pressing step. The plywood thus made is acceptable for many uses but loses shear strength rapidly on weathering.

One object of this invention is to provide a process for preparing plywood of improved shear strength after weathering.

A further object is to provide a process for preparing plywood of superior quality without extensive and expensive variation of the adhesive.

These and other objects are attained using an adhesive based on a formaldehyde condensate of urea modified with melamine by increasing the stack time or assembly time to a minimum of 15 hours.

The following examples are given in illustration and are not intended as limitations on the scope of this invention. Where parts are mentioned they are parts by weight.

EXAMPLE I

Prepare a urea-formaldehyde adhesive by reacting 1 mol of urea with from 1.8 to 2 mols of formaldehyde in an aqueous medium at an alkaline pH at reflux temperature at atmospheric pressure for about 1 hour. Then make the reaction medium slightly acid and dehydrate under vacuum to about 65% P. M. M. A. solids by weight.

EXAMPLE II

Prepare a melamine-formaldehyde adhesive by reacting 1 mol of melamine with from 2.5–3.5 mols of formaldehyde in an aqueous alkaline medium at reflux temperature at atmospheric pressure until a 25% water dilutability is obtained. Then spray dry the solution.

EXAMPLE III

Prepare a plywood adhesive by mixing together 138 parts of the urea adhesive of Example I with 10 parts of the dry melamine adhesive of Example II, 30 parts of a nut shell flour, 35 parts of water and 0.25 part of ammonium chloride. Mix the materials together until a uniform smooth paste-like adhesive is obtained having a viscosity of from 800–1600 centipoises.

EXAMPLE IV

Prepare plywood by spreading the glue of Example III on one side of wood veneer plies at the rate of 30–35 lbs. per 1000 square feet of glue line. Then assemble the coated plies into stacks placing an uncoated side against a coated side in each instance. Allow the spread assemblies to remain untouched at room temperature (20–35° C.) for varying periods of time. Then place the spread panel or panels in a press and laminate the plies under 200 p. s. i. at 240° F. for 3 minutes. The plywood prepared from the assemblies that have been allowed to stand for more than 15 hours has greatly improved weather resistance compared to plywood prepared from assemblies which have been allowed to stand for shorter periods of time before pressing.

The improvement in weatherability is clearly shown by testing the shear strength by A. S. T. M. test D906–49 after immersing test panels in boiling water for various periods of time. Boiling water is used to approximate in a short time the effect of severe weathering conditions. Test results for an all-birch construction are shown in Table I.

Table I

| Assembly Time, Hours | Boil Period, Hours | Shear Strength, p. s. i. |
|---|---|---|
| 1 | 1 | delaminated. |
| 2 | 1 | Do. |
| 7 | 1 | Do. |
| 18 | 1 | 430. |
| 18 | 4 | 190. |

From this table it can be seen that panels made from stacks left standing for up to 7 hours delaminated in boiling water after only 1 hour whereas panels made with an 18 hour assembly time withstood the boiling water for 4 hours without delamination.

The beneficial results of this invention are not attained until the assembly time is at least as long as 15 hours. The assembly time may be increased up to 24 hours with a slight upward variation in shear strength after boiling water treatment. After about 24 hours assembly time, the shear strength after the boiling water test drops off rapidly.

The attached drawing is an exploded view of a 3-ply plywood assembly prepared according to this invention. The adhesive is applied, as shown, to the upper surface of the bottom face veneer and to the upper surface of the central ply. The three plies are then placed together without pressure and the resultant assembly allowed to stand for more than 15 hours before pressing.

The adhesives which may be used in the process of this invention are urea-formaldehyde condensates modified with from 5 to 20% by weight of a melamine-formaldehyde condensate. Urea resins alone are not applicable since laminates made therewith delaminate after ½ hour in the boil test regardless of assembly time. The urea resins are prepared by reacting together 1 mol of urea with from 1.8 to 2 mols of formaldehyde. The reaction is generally started under alkaline conditions followed by resinification under acid conditions and then dehydrating to about 60–75% P. M. M. A. solids.

The melamine resins are prepared by reacting 1 mol of melamine with from 2 to 3.5 mols of formaldehyde under alkaline conditions to a water dilutability of 25%. The resins are then dehydrated by vacuum distillation, spray drying or other conventional drying means.

The adhesives are compounded by mixing the urea resins solution with the dry melamine resin, water, filler and catalyst at room temperature. The amount of water depends on the solids content of the urea resin solution and should be chosen to give an adequate spread viscosity which generally ranges from 800–1600 centipoises for the mechanical glue spreaders.

The fillers are generally fibrous materials such as pecan shell flours, walnut shell flours, alpha cellulose, etc. The nut shell flours are preferred. The amount of filler ranges from 25 to 40 parts per 100 parts of resin solids.

The catalyst should be an acid reacting salt such as ammonium chloride, ammonium sulfate, ammonium phosphates, etc. It should be added in amounts ranging from 0.2 to 0.5 part per 100 parts of resin solids.

The process of this invention makes it possible to prepare plywoods having relatively high shear strength even after extended exposure to severe weather conditions.

What is claimed is:

1. A process for preparing plywood from a plurality of veneers using a thermosetting adhesive based on 100 parts of a urea-formaldehyde condensate modified with from 5 to 20% by weight based on the urea-formaldehyde condensate of a melamine-formaldehyde condensate, which comprises spreading the adhesive on the veneers, assembling the veneers, maintaining said assembled veneers at 20 to 35° C. without pressure for from 15 to 24 hours and then pressing the assembled veneers under heat and pressure.

2. A process for preparing plywood from a plurality of wood veneers using a thermosetting adhesive based on 100 parts of a urea-formaldehyde condensate modified with 10% by weight based on the urea-formaldehyde condensate of a melamine-formaldehyde condensate which comprises spreading the adhesive on the veneers, assembling the veneers, maintaining said assembled veneers at 20 to 35° C. without pressure for from 15 to 24 hours and then pressing the assembled veneers under heat and pressure.

3. A process as in claim 2 wherein the assembled veneers are maintained at 20 to 35° C. for 18 hours.

References Cited in the file of this patent

UNITED STATES PATENTS

| | | |
|---|---|---|
| 2,328,425 | D'Alelio | Aug. 31, 1943 |
| 2,485,080 | Wohnsiedler et al. | Oct. 18, 1949 |
| 2,518,388 | Simons | Aug. 8, 1950 |
| 2,581,908 | Kinzinger | Jan. 8, 1952 |
| 2,625,524 | Kvalnes | Jan. 13, 1953 |
| 2,675,338 | Phillips | Apr. 13, 1954 |